United States Patent [19]

Sherif

[11] Patent Number: 5,451,389
[45] Date of Patent: Sep. 19, 1995

[54] METAL CARBIDES, PROCESS FOR MAKING THE SAME AND CATALYTIC END-USE

[75] Inventor: Fawzy G. Sherif, Stony Point, N.Y.

[73] Assignee: Akzo Nobel N.V., Arnhem, Netherlands

[21] Appl. No.: 156,670

[22] Filed: Nov. 23, 1993

Related U.S. Application Data

[63] Continuation of Ser. No. 878,726, May 4, 1992, abandoned.

[51] Int. Cl.$^6$ ............................................. C01B 31/30
[52] U.S. Cl. ................................... 423/439; 423/440; 502/177
[58] Field of Search ............... 423/439, 440, 441, 345; 502/177, 178; 501/87, 88; 51/307

[56] References Cited

U.S. PATENT DOCUMENTS

| | | | |
|---|---|---|---|
| 1,072,373 | 9/1913 | Acker | 423/439 |
| 3,141,737 | 7/1964 | Bartlett et al. | 423/412 |
| 3,865,750 | 2/1975 | Rase et al. | 252/443 |
| 3,871,998 | 3/1975 | Rase et al. | 208/216 |
| 4,515,763 | 5/1985 | Boudart et al. | 423/409 |
| 4,789,534 | 12/1988 | Laine | 423/249 |
| 5,256,451 | 10/1993 | Philipp et al. | 427/374.2 |
| 5,308,597 | 5/1994 | Ledoux et al. | 423/345 |

FOREIGN PATENT DOCUMENTS

| | | | |
|---|---|---|---|
| 343921 | 11/1989 | European Pat. Off. | C01B 31/34 |
| 2634665 | 2/1977 | Germany | 501/87 |
| 2634731 | 2/1977 | Germany | C04B 35/58 |
| 16968 | 1/1984 | Japan | 423/440 |
| 9011251 | 10/1990 | WIPO . | |

OTHER PUBLICATIONS

Derwent Abstract 13259y/08 (of DT 2634731) (1977).
L. Volpe et al., "Compounds of Molybdenum and Tungsten with High Specific Surface Area. II Carbides", Journal of Solid State Chemistry, 59, 348–356 (1985).
J. S. Lee et al., "Hydrodesulfurization of Thiophene Over Unsupported Molybdenum Carbide", Applied Catalysis, 19 (1985) 207–210.
J. S. Lee et al., "Molybdenum Carbide Catalysts. I. Synthesis of Unsupported Powders", Journal of Catalysis 106, 125–133 (1987).
S. T. Oyama et al., "Preparation and Characterization of Early Transition–Metal Carbides", Ind. Eng. Chem. Res. 1988, 27, 1639–1648.
E. J. Markel et al., "Catalytic Hydrodesulfurization by Molybdenum Nitride", Journal of Catalysis 126, 643–657 (1990).
F. H. Ribeiro et al., "Reactions of Neopentane, Methylcyclohexane, and 3,3-Dimethylpentane on Tungsten Carbides: The Effect of Surface Oxygen on Reaction Pathways", Journal of Catalysis 130, 86–105 (1991).
F. H. Ribeiro et al., "Catalytic Reactions of $\eta$-Alkanes on $\beta$-W$_2$C and WC: The Effect of Surface Oxygen on Reaction Pathways", Journal of Catalysis 130, 498–513 (1991).
E. Iglesia et al., "Bifunctional Reactions of Alkanes on Tungsten Carbides Modified by Chemisorbed Oxygen", Journal of Catalysis 131, 523–544 (1991).

*Primary Examiner*—Ferris Lander
*Assistant Examiner*—Stuart L. Hendrickson
*Attorney, Agent, or Firm*—Richard P. Fennelly; Louis A. Morris

[57] ABSTRACT

Transition metal carbides, having high surface areas and catalytic activity for use in pollution control, isomerization and hydrodesulfurization procedures, can be formed by the calcination of a mixture of an acyclic compound containing carbon-nitrogen-hydrogen bonding and a metal salt. The acyclic compound is preferably a compound of guanidine or a derivative thereof such as a deammoniated derivative of guanidine. The metal salt is preferably a metal halide such as a metal chloride.

4 Claims, No Drawings

METAL CARBIDES, PROCESS FOR MAKING THE SAME AND CATALYTIC END-USE

This is a continuation of application Ser. No. 7/878,726 filed May 4, 1992 now abandoned.

BACKGROUND OF THE INVENTION

The present invention relates to making metal carbides which have a high surface area and which are useful in certain catalytic processes.

A wide variety of processes are known for making metal carbide compositions. For example, German Offenlegungsschrift No. 2,634,731 speaks of making metal carbide-nitride powders by using a triazine or pyrimidine compound as the carbon and nitrogen source. More recently U.S. Pat. No. 4,789,534 to R. M. Laine teaches making transition metal carbides from certain metal amide precursors. These metal amide precursors can be prepared from lithium amides and the corresponding metal chlorides or by the reaction of a silyl amide with a metal chloride or fluoride.

SUMMARY OF THE PRESENT INVENTION

The present invention relates to a distinctly differing procedure for making metal carbides. The procedure involves the calcination of a mixture of a non-oxygen-containing acyclic compound containing carbon-nitrogen-hydrogen bonding and a metal salt. The compounds that are useful in regard to the present process are guanidine or a derivative thereof. The derivative can be a deammoniated derivative of guanidine such as cyanamide or dicyanimide. The use of the terminology "deammoniated derivative of" is not meant to imply that the designated derivative or derivatives are actually prepared by a deammoniation procedure. Rather, the terminology is used to describe the differences in structure, i.e., the "loss" of an ammonia moiety ($NH_3$), between the respective compounds of this class which have been found to be useful for the present invention. For example, guanidine has the chemical line formula $HN=C(NH_2)_2$, whereas one of its deammoniated "derivatives" cyanamide differs by an ammonia group ($NH_3$) and has the formula $H_2NCN$. Dicyanimide, in turn, lacks an ammonia unit as compared to cyanimide and has the formula $HN(CN)_2$. Both guanidine and cyanamide, if reacted together, form a compound which contains one less ammonia group than their sum, i.e., it is the "deammoniated" derivative dicyandiamide (or cyanoguanidine), which has the formula $HN=C(NH_2)(NH-CN)$, of the sum of their molecular formulae.

The metal salt which is useful can be a metal halide such as a metal chloride, a metal nitride, a metal sulfide, or a metal boride.

It has been found that the metal carbides formed by the foregoing process have high surface areas in excess of 100 m²/g, namely from about 200 to 300 m²/g. They are useful in catalytic end-uses including isomerization and hydrodesulfurization.

DETAILED DESCRIPTION OF PRESENT INVENTION

As indicated before, the metal carbides which are intended from the process of the present invention are formed by the calcination of a mixture of a non-oxygen-containing acyclic compound containing carbon-nitrogen-hydrogen bonding and a metal salt. The terminology "acyclic compound containing carbon-nitrogen-hydrogen bonding" is intended to cover non-cyclic compounds which are essentially free of oxygen and which have covalent bonds between carbon and nitrogen and between nitrogen and hydrogen. The compounds which can be used include guanidine, its deammoniated derivative cyanamide, and the deammoniated derivative of cyanamide which is dicyanimide. Another compound that can be used is the deammoniated derivative of guanidine and cyanamide which is termed dicyandiamide or cyanoguanidine. These compounds can be used as such or can be used in the form of adducts, such as their hydrochlorides or carbonates.

All of these compounds are free of oxygen and contain at least one carbon to nitrogen to hydrogen covalent bond.

The foregoing types of acyclic compounds are mixed with an appropriate transition metal salt prior to being calcined in accordance with the present invention. Representative transition metals in such a transition metal salt include tungsten, titanium, vanadium, molybdenum, zirconium, and nickel, among others. The type of metal salt which is preferred is a halide such as a chloride. The metal salt and acyclic compound are mixed preferably in approximate stoichiometric amount for the final metal carbide which is desired. Mixing can be achieved by adding solvents of each component or by admixing the solid dry components. The reaction, in the case of use of the guanidine hydrochloride as a reagent, may be represented by the following equation:

where M is the selected metal. The value of y is dictated by the valency of the metal, M, and it determines the value of x. It is preferable that the ratio of x to y is about 3:1, however, it may vary from about 1:1 to about 10:1. The above equation only presents the major products of the reaction. Other intermediates such as chlorine gas and cyanide may also be formed in addition to chloramines ($NH_2Cl$ and $NHCl_2$). The metal carbide formed can be $M_mC_n$, where m and n vary from about 5:1 to about 1:1 depending upon the ratio of x to y.

The calcination needs to be conducted at temperatures sufficiently high, e.g. from about 400° C. to about 900° C. for a sufficiently long length of time, e.g. for about one hour to about five hours under an appropriate inert atmosphere such as helium, argon or nitrogen. The metal carbide formed is considered to be an interstitial alloy and is an excellent electrical conductor having a metallic color and good hydrolytic stability. The metal carbide product can also be an excellent catalyst for a number of reactions normally carried out by the more expensive noble metals. Thus far, most metal carbides prepared by other processes have surface areas between 30 and 100 m²/g. For example, tungsten carbide prepared from tungsten trioxide, methane, and hydrogen, according to the process described by E. Iglesia et al., Journal of Catalysis, 131, 523 (1991), has a surface area of about 30 m²/g. Molybdenum carbide prepared by J. S. Lee et al., Journal of Catalysis, 106, 125 (1987) has a surface area of 84 m²/g.

The resulting metal carbide product according to the present invention has been found to be a high purity metal carbide of high porosity and high surface area, for instance as surface area of over 120 m²/g, preferably 200–300 m²/g.

The resulting metal carbide has a low carbon content, e.g. below about 10% by weight. It has been found that it is a catalytically active material as demonstrated in certain of the Examples set forth below.

The same bulk metal carbides could be supported on an inert material for the purpose of reducing cost and effective handling of extrudates of the mixtures. The inert material can be one such as silica, alumina, titania, zirconia, and mixtures thereof. The inert materials can be precalcined at the temperatures previously described to remove trace moisture and air inside their pores. These inert materials can then be mixed with the solid reactants (i.e., transition metal salt and acyclic compound containing C—N—H bonding) and calcined as such or after being formed into tablets or extrudates to yield the desired supported metal carbide compositions.

In regard to catalytic activity it has been found, for example, that a tungsten carbide material made in accordance with the present invention can be used as a catalyst for converting low, but environmentally unacceptable, concentrations, e.g., 0.01% to 3%, of carbon monoxide, in the presence of small concentrations, e.g., 0.01% to 3%, of oxygen, most preferably about 1.4% for both carbon monoxide and oxygen, respectively, with other nitrogen oxide components in automobile exhausts, to carbon dioxide and water. The material can also be utilized as an isomerization catalyst for converting a straight chain $C_6$ to $C_{10}$ alkanes to a branched chain alkane. One particular use for such a catalyst is in the production of branched isomers from higher alkanes such as $C_8$–$C_{10}$ alkanes. In this capacity the catalyst may be a replacement for the more expensive platinum or palladium noble metals.

Another catalytic process in which a tungsten carbide catalyst in accordance with the present invention can be employed is in hydrodesulfurization procedures in which sulfur values are removed from a hydrocarbon feedstock.

The present invention is illustrated by the Examples which follow.

EXAMPLE 1

Twenty grams of tungsten hexachloride (0.05) and 25.2 g of dicyandiamide (both obtained from Aldrich Chemicals) were mixed under nitrogen and then were heated slowly. At about 100° C., reaction occurred with the evolution of gases. The mixture was then heated at 350° C. for one hour. Hydrogen chloride vapors evolved. The residue was stable in air. It was heated under argon gas to 900° C. and held at that temperature for two hours. The product was a black powder, 10 g. Calculated for WC: 9.8 g. The x-ray diffraction (XRD) pattern for this product showed WC and tungsten metal.

EXAMPLE 2

One gram of the powder prepared in Example 1 was tested for catalytic activity for the oxidation of CO to $CO_2$. A gas stream containing 1.4% carbon monoxide, 1.4% $O_2$, and the balance $N_2$, was passed over the catalyst at a flow rate of 300 ml per minute in a reactor at differing temperatures. The results obtained were:

| TEMPERATURE (°C.) | % CONVERSION OF CO TO $CO_2$ |
|---|---|
| 400 | 74 |
| 350 | 41 |
| 300 | 20 |

| TEMPERATURE (°C.) | % CONVERSION OF CO TO $CO_2$ |
|---|---|
| 250 | 8 |

For comparison, a platinum catalyst obtained from the catalytic converter of a 1991 Escort Ford vehicle was tested under the same conditions. The catalyst was a cylinder (2.2 cm diameter by 6 cm length) made of extruded cordierite support (total weight: 13.1 g). The conversion of CO to $CO_2$ was:

| TEMPERATURE (°C.) | % CONVERSION OF CO TO $CO_2$ |
|---|---|
| 400 | 100 |
| 350 | 100 |
| 250 | 94 |
| 200 | 89 |
| 150 | 78 |

EXAMPLES 3–6

The purpose of these Examples is to determine the optimum reaction temperature and reactant mole ratios for forming tungsten carbide free of tungsten metal or carbon. In four separate experiments, 12 g portions of tungsten hexachloride (0.03 mole) were each dissolved in 100 cc toluene, and cyanoguanidine was added in amounts of 2.5 g (0.03 mole), 5 g (0.06 mole), 10 g (0.12 mole), and 15 g (0.18 mole), respectively. Each mixture was refluxed for two hours. The blue tungsten solution turned brown. The liquid was distilled off, and the residues were heated to 200° C. to give a black powder. Each powder was split into four subportions to form a grid of sixteen. Each set of four with the same molar ratios of reactants was heated at 500°, 700°, 900° and 1100° C. The resulting powder was identified by weight and XRD. The results showed that all powders (1:1, 1:2, 1:4 and 1:6 molar ratios) heated at 500° had low crystallinity. Powders heated at 700°C. showed low crystallinity at the 1:1 molar ratio but contained $W_2C$ in the 1:2 and 1:4 ratios. The 1:6 ratio gave a mixture of $W_2C$ and tungsten oxide. At 900° C., all powders gave tungsten metal as a major component, WC and tungsten oxide. At 1100° C., all powders contained excessive tungsten metal. It was concluded that at 500° C. the reaction started. Above 900° C., excessive reduction to tungsten metal occurred. The optimum ratio of tungsten hexachloride to cyanoguanidine would be between 1:2 and 1:4 (probably 1:3) and the optimum temperature between 700° and 900° C., (probably 800° C.) under the reaction conditions used in this Example.

EXAMPLE 7

Solid tungsten hexachloride, 24 g (0.06 mole), was mixed in a mortar with 15 g of cyanoguanidine (0.18 mole) under nitrogen. The mixture was loaded in an alumina cup and was heated at 200° C. for two hours, to 800° C. over eight hours, and was held at 800° C. for two hours and then cooled to room temperature (all under argon). The black spongy-like porous mass had a bulk density of 2.5 cc/g. On crushing, the bulk density of the powder that was formed was 1.6 cc/g, its weight was 11.75 g, its surface area was 208 $m^2$/g, and the crystalline phases that were produced were a mixture of $W_2C$, as a major component, and WC, as a minor component.

The powder was then introduced into a micro-reactor and was activated with hydrogen gas at 550° C. for five hours. The catalyst was then tested at 350° C. using a stream of H₂ gas saturated with n-hexane as a model reforming reaction. The flow rate of $H_2$ was 50 cc/min. The conversion of n-hexane was 10%. The product distribution was 20% low hydrocarbons, such as methane, ethane, propane, butane, and pentane (hydrogenolysis), 60% 2-methyl pentane and 3-methyl pentane (isomerization), with the balance being aromatics. At 400° C., the conversion increased to 25% with the same product distribution.

EXAMPLE 8

This Example is similar to Example 7 except that the reactants were heated to 750° C. instead of 800° C. The weight of the product was 12.2 g, the bulk density of the powder was 1.75 cc/g, the surface area was 206 m²/g, and the crystalline phases were a mixture of $W_2C$ and WC. Upon activation with hydrogen at 550° C. for five hours using a hydrogen flow of 10 cc/min, the product was tested using a hydrogen/n-heptane mixture as a model for reforming.

The apparatus used in this Example to test the catalytic activity involved use of hydrogen gas from a cylinder, passing at room temperature (24°–25° C.) through a reservoir of n-heptane at room temperature. The saturated hydrogen gas was introduced into a 5 cc reactor tube heated to different temperatures. The catalyst used was 0.5 g supported on glass wool to fit in the middle portion of the tube reactor. Gaseous products were analyzed on stream using a gas chromatograph.

The following catalytic activity and selectivity data were obtained:

| Catalyst Temperature (°C.) | % Conversion | Product Distribution % | | |
|---|---|---|---|---|
| | | $(C_1-C_6)$ Hydrogenolysis | $(C_5-C_7)$ Isomers | $(C_6-C_7)$ Aromatics |
| 329 | 15 | 8 | 84 | 0 |
| 370 | 48 | 20 | 67 | 4 |
| 405 | 73 | 34 | 30 | 20 |
| 465 | 96 | 50 | 1.3 | 48 |

This catalyst had high selectivity, 84%, to isomerization at the relatively low temperature of 329° C. By increasing the temperature to 465° C., the selectivity to aromatics increased to 48%.

The $C_1-C_6$ hydrogenolysis products were identified as methane, ethane, propane, isobutane, n-butane, isopentane, n-pentane and n-hexane. The $C_5$ to $C_7$ isomers were identified as dimethylpentane, 2-methylhexane, 2,3-dimethylpentane, and 3methylhexane. The $C_6$ to $C_7$ aromatics were benzene and toluene.

EXAMPLE 9

This catalyst was prepared by mixing 12 g tungsten hexachloride (0.03 mole) and 7.5 g of cyanoguanidine (0.09 mole) with 40 g of titanium dioxide as an inert support. The mixture was heated gradually over a period of eight hours to 800° C. and was held at this temperature for two hours under argon. A black powder was formed. Its bulk density was 1.4 cc/g. The catalyst was tested using an n-heptane/hydrogen mixture after being activated at 550° C. for sixteen hours. The results indicated catalytic activity. At 350° C., the conversion was low, 3%, but the selectivity to isomerization was high, 61%. At 475° C., the conversion was 49%, with 34% of the products being low hydrocarbons (hydrogenolysis), 12% isomers, and 35% aromatics. The balance in both cases were unidentified products.

EXAMPLE 10

This Example is similar to Example 8 except that the reaction was carried out under a large blanket of nitrogen, The black powder was more uniform, The bulk density of the powder was 1.75 cc/g, It was found that this catalyst had catalytic activity similar to the catalyst in Example 8 without the need for preactivation with hydrogen at 550° C. as was the case in earlier Examples, The following catalytic activity was noted for the conversion of n-heptane:

| Catalyst Temperature (°C.) | % Conversion | Product Distribution % | | |
|---|---|---|---|---|
| | | $(C_1-C_6)$ Hydrogenolysis | $(C_5-C_7)$ Isomers | $(C_6-C_7)$ Aromatics |
| 310 | 4 | 6 | 84 | 0 |
| 363 | 19 | 35 | 56 | 1 |
| 410 | 53 | 57 | 31 | 6 |
| 457 | 93 | 71 | 6 | 22 |

EXAMPLE 11

This Example shows the stability of the catalyst formed in Example 10. At a catalyst temperature of 363° C., a stream of hydrogen gas saturated with n-heptane was passed over 0.5 g of the catalyst, and the conversion was measured over a period of eighteen hours. The results showed that this catalyst increased slowly in performance until it reached a steady state with no deterioration in activity. The results are given in the following Table:

| % Conversion | Time in Stream (hrs) |
|---|---|
| 9.2 | 2 |
| 13.2 | 3 |
| 15.2 | 4 |
| 16.4 | 4.5 |
| 19.3 | 17 |
| 19.0 | 18 |

EXAMPLE 12

This catalyst was prepared by mixing 12 g $WCl_6$ of tungsten hexachloride (0.03 mole) with 8.6 g of guanidine hydrochloride (HN=C—(NH₂)₂.HCl, 0.09 mole, (from Aldrich Chemicals) followed by heating the mixture from room temperature to 200° C. in two hours, holding at 200° C. for two hours, then raising the temperature to 750° C. in seven and one half hours, and holding it at 750° C. for two hours under nitrogen. The powder formed weighed 5.5 g. X-ray diffraction analysis showed it to be tungsten carbide ($W_6C_{2.54}$). Its surface area was 122 m²/g.

The catalytic activity of this catalyst was tested using a model reforming reaction of n-heptane and hydrogen in a micro-reactor system. The results showed good activity and selectivity to isomerization for the catalyst as depicted in the following Table:

| Catalyst Temperature (°C.) | % Conversion | Product Distribution % | | |
|---|---|---|---|---|
| | | $(C_1-C_6)$ Hydrogenolysis | $(C_5-C_7)$ Isomers | $(C_6-C_7)$ Aromatics |
| 318 | 8.5 | 6 | 88 | 0 |
| 363 | 26 | 9 | 88 | 0 |

-continued

| Catalyst Temperature (°C.) | % Conversion | Product Distribution % | | |
|---|---|---|---|---|
| | | ($C_1$-$C_6$) Hydrogenolysis | ($C_5$-$C_7$) Isomers | ($C_6$-$C_7$) Aromatics |
| 409 | 52 | 21 | 74 | 1 |

EXAMPLE 13

This Example demonstrates that vanadium carbide could be prepared by the reaction of vanadium trichloride ($VCl_3$) and guanidine hydrochloride: 15.73 g of $VCl_3$ (0.1 mole), from Aldrich Chemicals, was mixed with 14.32 g of guanidine hydrochloride (0.15 mole) in a mortar under nitrogen gas and was then heated to 150° C. over two hours and then to 750° C. for over seven and one half hours. It was held at 750° C. for two hours and was then cooled down to room temperature under nitrogen. A black powder formed. X-ray diffraction studies showed it to be vanadium carbide ($V_8C_7$). The surface area of the powder was 150 $m^2$/g.

The powder was tested for its catalytic activity using the hydrogen/heptane gas mixture described in Example 8. The results were given below:

| Catalyst Temperature (°C.) | % Conversion | Product Distribution % | | |
|---|---|---|---|---|
| | | ($C_1$-$C_6$) Hydrogenolysis | ($C_5$-$C_7$) Isomers | ($C_6$-$C_7$) Aromatics |
| 363 | 1.2 | 42 | — | — |
| 459 | 19.4 | 28 | 23 | 27.5 |

EXAMPLE 14

A mixture of 8.2 g molybdenum pentachloride (0.03 mole), from Aldrich Chemicals, and 7.2 g of guanidine hydrochloride (0.075 mole) was heated as in Example 13. The black powder that was formed was identified by x-ray diffraction as the $Mo_{0.42}C_{0.58}$ molybdenum carbide phase. The surface area of the powder was 55 $m^2$/g.

The powder was tested in a similar manner to those described in Example 8. The results are given below:

| Catalyst Temperature (°C.) | % Conversion | Product Distribution % | | |
|---|---|---|---|---|
| | | ($C_1$-$C_6$) Hydrogenolysis | ($C_5$-$C_7$) Isomers | ($C_6$-$C_7$) Aromatics |
| 364 | 9.5 | 29.4 | 46.9 | 2.4 |
| 410 | 37 | 53.8 | 20.1 | 12.2 |
| 459 | 99.2 | 85.7 | 0 | 13.6 |

EXAMPLE 15

A high surface area tungsten carbide was prepared by heating tungsten chloride and cyanoguanidine in a molar ratio of 1:3 at 750° C. for two hours under nitrogen. The surface area of the resulting product was 227 $m^2$/g and its bulk density was 1.75 cc/g.

This tungsten carbide catalyst was then used as a thiophene hydrodesulfurization (HDS) catalyst. The thiophene desulfurization rate was measured in a fixed bed micro reactor in which 0.5 g of the tungsten carbide was exposed to a continuous flow of hydrogen which contained 3.5 vol % thiophene and 2.2 vol % n-heptane at a flow rate of 10 ml/min. The results obtained are shown below:

| Catalyst Temp. (°C.) | % Conversion of Thiophene | % Conversion of n-heptane | % thiophene products | |
|---|---|---|---|---|
| | | | $C_4$ | Others |
| 319 | 38.6 | 3 | 80.1 | 20 |
| 363 | 67 | 8 | 100 | 0 |
| 410 | 87 | 14 | 100 | 0 |
| 457 | 91 | 44 | 100 | 0 |

| Catalyst Temp. (°C.) | % n-Heptane Products | | |
|---|---|---|---|
| | $C_1$-$C_6$ Hydrogenolysis (%) | $C_6$-$C_7$ Isomers (%) | $C_6$-$C_7$ Aromatics (%) |
| 319 | 75 | 20 | 0 |
| 363 | 19 | 23 | 0 |
| 410 | 28 | 10 | 3.6 |
| 457 | 15.4 | 12.6 | 43.5 |

Thiophene conversion was about 38% at about 320° C. and reached 91% at about 460° C. The major products were butenes and n-butane. These results compare favorably with those published by Boudart et al., Applied Catalysis, 19 (1985), 207–210 for use of molybdenum carbide and a presulfided molybdenum-alumina composition. These results also compare favorably to those reported by Markel et al., Journal of Catalysis 126, 643–657 (1990) for molybdenum nitride and a cobalt-molybdenum-alumina industrial-type catalyst where the thiophene conversions at 400° C. were 38% and 50%, respectively.

Thiophene reduced the conversion of n-heptane in the mixture by 50%–70% at all temperatures as compared to the conversions of n-heptane as a single component. Thiophene also suppressed catalyst selectivity of n-heptane to hydrogenolysis, $C_1$ to $C_5$ hydrocarbons, and to isomerization. Selectivity to aromatics doubled only at the high temperature of 460° C.

The foregoing Examples are presented for illustrative purposes only. The scope of protection is set forth in the claims which follow.

I claim:

1. A process for forming a transition metal carbide catalyst which comprises the calcination, in an inert atmosphere, of a mixture of (1) an acyclic compound selected from the group consisting of guanidine and an adduct of guanidine, and (2) a transition metal salt.

2. A process as claimed in claim 1 wherein the metal salt is a metal halide.

3. A process as claimed in claim 1 wherein the metal salt and the acyclic compound are mixed with an inert material as a support.

4. A process as claimed in claim 3 wherein the inert material is selected from the group consisting of silica, alumina, titania, zirconia, and mixtures thereof.

* * * * *